United States Patent [19]

Hart et al.

[11] Patent Number: 5,020,362

[45] Date of Patent: Jun. 4, 1991

[54] FUEL INJECTION SYSTEM TESTER

[75] Inventors: George R. Hart, Lakewood; Charles J. Nehoda, Broadview Heights, both of Ohio

[73] Assignee: Hickok Electrical Instrument Company, Cleveland, Ohio

[21] Appl. No.: 538,767

[22] Filed: Jun. 15, 1990

[51] Int. Cl.⁵ .......................... G01M 19/00

[52] U.S. Cl. .......................... 73/119.00 A; 73/49.7

[58] Field of Search .................. 73/119 A, 49.7, 40, 73/49.2 R

[56] References Cited

U.S. PATENT DOCUMENTS 3,800,586 4/1974 Delatorre et al. .................. 73/49.2
4,404,844 9/1983 Hegler .................................. 73/49.2
4,788,858 12/1988 Liebermann ...................... 73/119 A

FOREIGN PATENT DOCUMENTS 1025909 6/1983 U.S.S.R. ........................... 73/119 A

*Primary Examiner*—Jerry W. Myracle
*Attorney, Agent, or Firm*—James A. Hudak

[57] ABSTRACT

A device for testing an automobile's fuel delivery system, including each of the components thereof, is disclosed. The device performs a number of tests to check the ability of the fuel delivery system to maintain pressure, to determine the static and dynamic flow rates through each of the fuel injectors in the fuel system and to determine the ability of the fuel system to deliver sufficient fuel during wide-open throttle operation.

17 Claims, 3 Drawing Sheets

FUEL SYSTEM

FUEL INJECTION SYSTEM TESTER

TECHNICAL FIELD

The present invention relates, in general, to a device for testing an automobile's fuel delivery system and, more particularly, to a device for testing the operation of the complete fuel delivery system and each of the components comprising same.

BACKGROUND ART

Various devices are available for testing the operation of the individual components within an automobile's fuel delivery system. For example, the electrical components within the system can be tested for electrical continuity. In addition, those components which permit the passage of the fuel therethrough can be tested to determine if any obstructions are present therein which would prevent or impede fuel flow. Even though devices are available for testing the components within the fuel system, no single device is presently available to test each of the components individually and/or as part of the complete fuel delivery system. The lack of a device for testing the operation of the complete fuel delivery system is further complicated by the fact that there is no device that can adequately test the fuel injectors while leaving the fuel delivery system intact. With the wide spread use of fuel injectors in fuel delivery systems, the ability to test the injectors under various operating conditions has become very important. Various devices are available for testing fuel injectors, however, they are typically of the flowmeter type which requires the removal of the injectors from the fuel delivery system to test same or the modification of the system to accommodate the testing procedures required by the devices. The devices determine the rate of flow through a fuel injector and the operator compares same against injector flow specifications. If the flow rate through an injector does not meet specifications, the injector might require cleaning or might be discarded as being defective. It should be noted that the injector is tested only under static conditions and, typically, multiple tests are not conducted on the same injector to verify the accuracy of the results. In addition, each injector is not tested in a dynamic environment and the injectors are typically not tested to determine flow therethrough in the complete fuel delivery system.

Because of the deficiencies associated with the presently available devices for testing fuel delivery systems and the individual components comprising same, particularly the fuel injectors, it has become desirable to develop a device which can be utilized to test the operation of the complete fuel delivery system and the operation of each of the individual components thereof.

SUMMARY OF THE INVENTION

The present invention solves the problems associated with the prior art and other problems by providing a device for testing an automobile's complete fuel delivery system including each of the components thereof. The device is capable of conducting a number of tests on the vehicle without disconnecting a single component of the fuel delivery system. The device performs a pressure regulator test by monitoring fuel pressure and vacuum within the fuel delivery system in order to determine whether the pressure regulator is operating properly. A leak down test checks the ability of the fuel delivery system to hold pressure thus determining whether there are any leaks in the system. In this manner, faulty check valves, leaky fuel injectors, leaky fuel lines and/or leaky O-rings causing the injectors to be improperly sealed to the fuel rail can be located. An injector flow test measures individual injector flow rates, both dynamic and static, in order to detect clogged, slightly clogged, leaking or broken injectors. The device presents actual injector flow readings permitting individual injector flow analysis to be performed. The device also performs a fuel system maximum flow test to determine the ability of the fuel system to deliver sufficient fuel during wide-open throttle operation. Lastly, the device performs a purge test to ensure that all fuel within the device has been transferred to the automobile after the foregoing tests have been completed.

DESCRIPTION OF THE PREFERRED EMBODIMENT

Figure 1A:
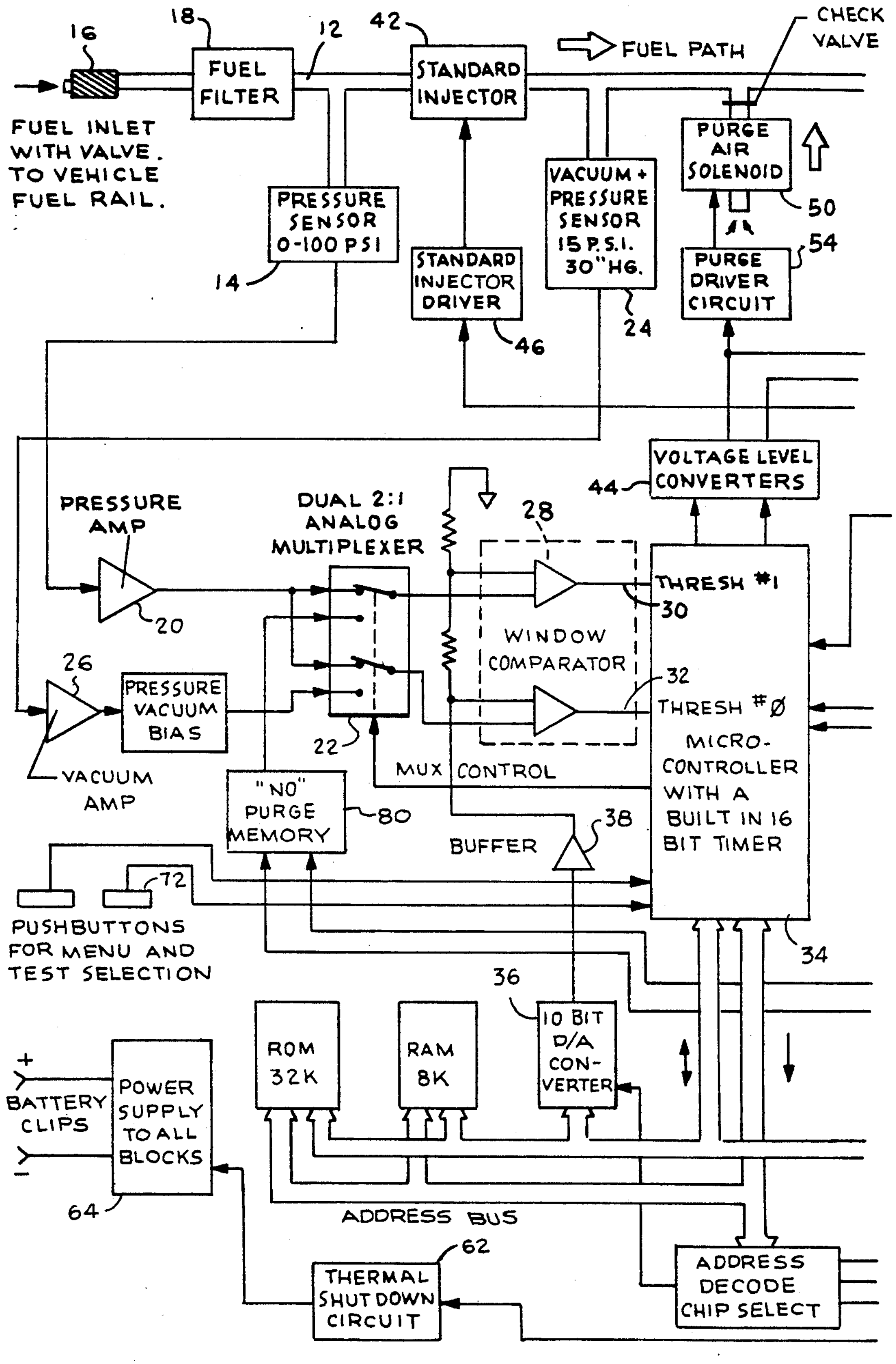
FIG. 1 (including parts 1A and 1B) is a schematic diagram of the present invention.
Figure 1B:
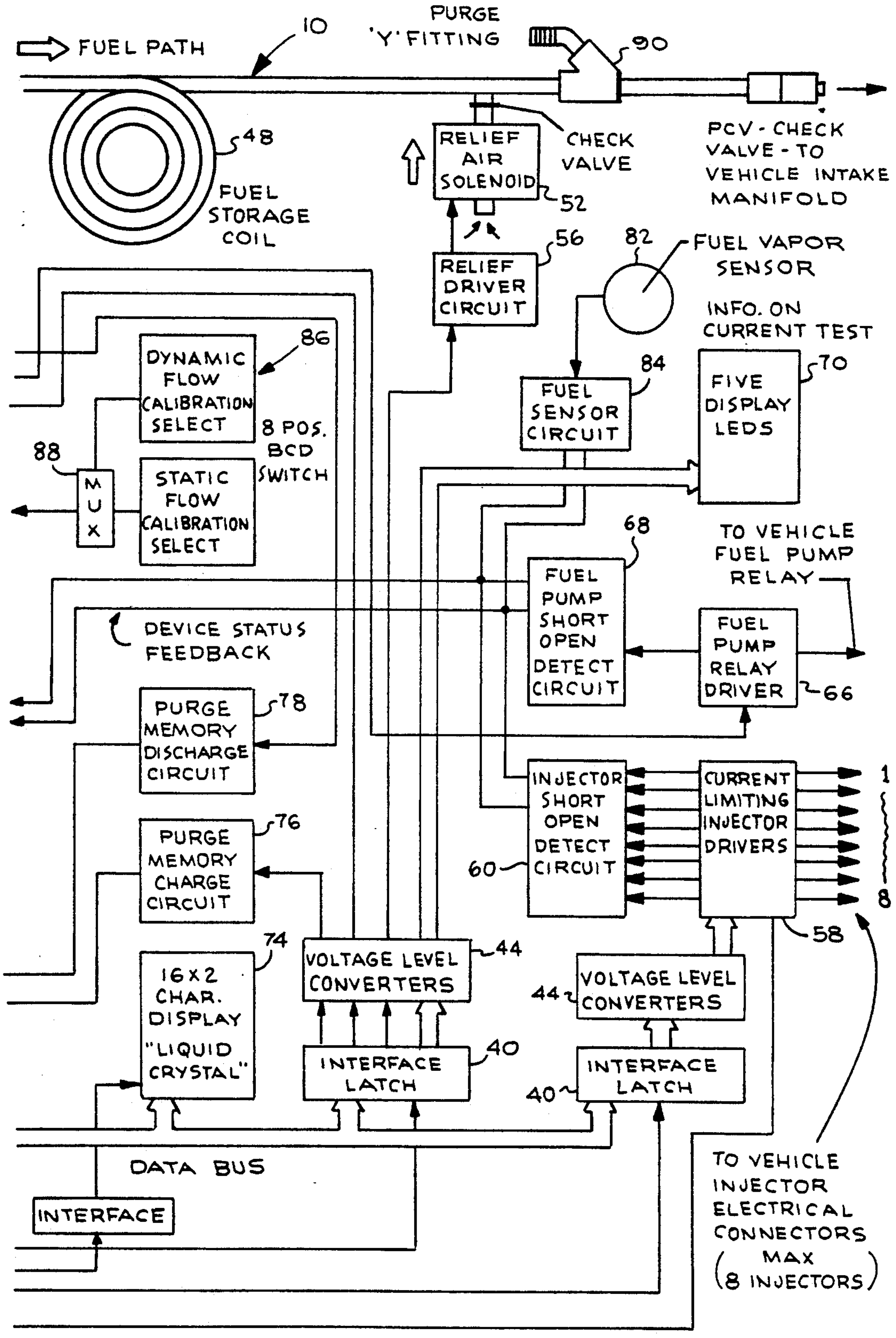

Referring now to the drawings where the illustrations are for the purpose of describing the preferred embodiment of the present invention and are not intended to limit the invention hereto, FIG. 1 is a schematic diagram of the fuel injector regulator system tester 10 of the present invention. The fuel injector regulator system tester 10 is capable of testing an automobile's complete fuel delivery system including the fuel injectors, fuel pump relay, fuel pump, fuel lines and fuel pressure regulator. As such, it can perform various tests, such as a pressure regulator test, a leak down test, an injector flow test, a fuel system maximum flow test, and a system purge test, all hereinafter described.

The fuel injector regulator system tester 10 has a fuel passageway incorporated therein, shown generally by the numeral 12, and also includes a pressure sensor 14 connected to a fuel inlet valve 16 via a fuel filter 18. The fuel inlet valve 16 is normally closed and opens upon connection to the fuel rail (not shown) on the vehicle being tested. The pressure sensor 14 typically has a range of 0 to 100 psi. The output of the pressure sensor 14 is connected to the input to a pressure amplifier 20 whose output is connected to an input to a multiplexer 22. A vacuum sensor 24 is provided and its input is connected to the fuel passageway 12. The output of the vacuum sensor 24, which typically is biased by an associated amplifier 26 to have a range of 30 in./hg. to 15 psi, is connected to another input to the multiplexer 22. The outputs of the multiplexer 22 are connected to a pair of inputs to a dual window comparator 28 having a first threshold output 30 and a second threshold output 32 which are connected to the inputs to a micro-controller 34 having an internal 16 bit timer. The micro-controller 34 includes 32K of ROM memory and 8K of RAM memory. The system bus for the micro-controller 34 is connected to the input to a digital to analog converter 36 whose output is connected, via a buffer 38, to another pair of inputs to the dual window comparator 28. The system bus is also connected to a pair of interface latches 40 to provide output control signals as hereinafter described. One output of the micro-controller 34 is connected to an input to a standard fuel injector 42 via an interface latch 40, a voltage level converter 44, and a standard injector driver 46. The interface latch 40 and the voltage level converter 44 are typically an integral part of the micro-controller 34. The fuel injector 42 acts as a standard against which the fuel injectors on the vehicle are compared. The fuel injector 42 is connected within the fuel passageway 12 so as to be in fluidic communication with the fuel filter 18 and a coiled fuel storage tube 48 which has a purge air solenoid valve 50 and a relief air solenoid valve 52 at its input and output, respectively. A check valve is interposed between each of the solenoid valves 50 and 52 and the input and output, respectively, of the fuel storage tube 48. Operation of the purge air solenoid valve 50 is controlled by the micro-controller 34 via a voltage level converter 44 contained therein and a purge valve driver circuit 54. Similarly, operation of the relief air solenoid valve 52 is controlled by the micro-controller 34 via a voltage level converter 44 and interface latch 40 both contained within the micro-controller 34 and via a relief valve driver circuit 56. The fuel storage tube 48 is used to store the fuel which passes through the standard fuel injector 42 during tests. The solenoid valves 50 and 52 are used to control the metering of the stored fuel back to the vehicle intake manifold after testing has been completed.

Another output of the micro-controller 34 is connected to the inputs to injector drivers 58 via an interface latch 40 and a voltage level converter 44 both of which are an integral part of the micro-controller 34. One set of outputs of the injector drivers 58 is connected to an injector "short-open" detection circuit 60 whose output is connected to an input to the micro-controller 34; the other set of outputs of the injector drivers 58 is connected to the fuel injectors on the vehicle being tested. Circuitry is provided for driving a full range of fuel injectors having different impedances as well as obtaining feedback information on the electrical integrity of each vehicle fuel injector. Such information is provided by the injector "short-open" detection circuit 60, as hereinafter described. The injector drivers 58 are also protected by a thermal circuit breaker 62 which turns off the power supply 64 if a pre-determined temperature, such as 70 C.°, is exceeded. A still another output of the micro-controller 34 is connected to the input to a fuel pump driver 66 via a voltage level converter 44. An output of the fuel pump relay driver 66 is connected to a fuel pump "short-open" detection circuit 68 whose output is connected to an input to the microcontroller 34; another output of the fuel pump driver 66 is connected to the fuel pump relay on the vehicle being tested. The fuel pump relay driver 66 also provides information on the electrical integrity of the fuel pump relay coil on the vehicle. Such information is provided by the fuel pump "short-open" detection circuit 68, as hereinafter described. A light-emitting diode array 70 is provided to display the current test in progress. Push buttons 72 are connected to the micro-controller 34 to permit the technician to input instructions to the tester or select tests to be performed. A liquid crystal display 74 is provided and connected to an output of the microcontroller 34 to provide information and test results to the technician operating the tester 10. A system purge memory charge circuit 76, a purge memory discharge circuit 78 and a "no" purge memory circuit 80 interconnect the voltage level converter 44 within the micro-controller 34 with an input to the multiplexer 22. The operation of these latter components is involved with the purge cycle of the tester 10, as hereinafter described. A fuel vapor sensor 82 and a fuel sensor circuit 84 are connected to an input to the micro-controller 34 and are utilized to warn the technician of an internal fuel leak.

With respect to operation of the fuel injector regulator system tester 10, conversions are performed by the micro-controller 34, the digital to analog converter 36 and the dual window comparator 28. The micro-controller 34 performs successive algorithms whereby the multiplexer 22 is set to route a signal from either the pressure sensor 14, the vacuum sensor 24, or the "no" purge memory circuit 80 to the dual window comparator 28. At the time the tester is turned on, the following actions, which are important to its operation, occur. The vehicle fuel pump is immediately turned on to determine if the ignition key is "on". If the key is "on", the fuel pressure is measured and self diagnostics commence to check for fuel vapors or internal electrical problems within the system. Approximately 10 seconds later, the pressure is again measured and if the pressure has dropped by more than 5 psi, an error message is displayed to indicate the possibility that an injector is stuck in the open position which might cause hydraulic lockup in the vehicle. If an error message is displayed, further tester operation is terminated. If no problems are found, the technician is advised to press a button after all vehicle hookups have been completed. During the aforementioned initial energization of the fuel pump, some of the air that was between the inlet valve 16 and the fuel filter 18 usually becomes trapped in the filter 18. When this occurs, the standard injector 42 is opened and the excess air is drained off until a pressure of 2.0 psi is reached. This action results in a consistent air reservoir being trapped within the filter 18 which provides pneumatic action for the pressure drop measurements made in flow rate testing, hereinafter described. It should also be noted that the resulting air reservoir, which has a volume of about 1 cc at 35 psi, improves the accuracy and dynamic range of the injector flow test measurements. The vehicle fuel pump relay is then energized again to increase the fuel pressure to its regulated value. The fuel pump continues to run while the standard injector 42 is given a series of pulses of decreasing pulse widths to remove all remaining air from the fuel path on the inlet side of the tester and to the standard injector 42. At this time, the micro-controller 34 actuates the purge memory charge circuit 76 to charge the "no" purge memory circuit 80 indicating that fuel has passed into the fuel storage coil 48. The fuel injector regulator system tester 10 is now ready to perform tests.

As previously indicated, the fuel injection regulator system tester 10 can test the fuel injectors, fuel pump relay, fuel pump, fuel lines and fuel pressure regulator. Testing of the foregoing components is accomplished through the following tests:

(1) Pressure regulator test;
(2) Leak down test;
(3) Injector flow test;
(4) Fuel system maximum flow test; and
(5) Purge test.

Each of the foregoing tests will now be described in detail.

The pressure regulator test determines whether the fuel delivery system pressure is within specifications and whether the vacuum control on the vehicle pressure regulator is operating properly. In this test, the micro-controller 34 sets the multiplexer 22 first to route a signal from the pressure sensor 14 to the window comparator 28. A successive approximation is performed on the signal and the result is shown on the liquid crystal display 74. The micro-controller 34 then sets the multiplexer 22 to route a signal from the vacuum sensor 24 to the window comparator 28. Here again, a successive approximation is performed on the signal and the result is shown on the liquid crystal display 74. The foregoing sequence is repeated so as to provide a continuous presentation of fuel pressure at the fuel rail and manifold vacuum at the PCV valve. The readings may be in the English system (PSI for pressure and inches of Hg for vacuum), or in the metric system (kPa). In any event, this test requires the technician to compare the readings shown on the liquid crystal display 74 with published specifications. Operationally, measurement accuracy of plus or minus 2% has been achieved in this test.

The leak down test checks the ability of the fuel delivery system to hold pressure thus determining whether there are any leaks in the system. Such leaks can be caused by faulty check valves, leaky fuel injectors, leaky fuel lines and/or leaky O-rings causing the injectors to be improperly sealed to the fuel rail. The leak down test is similar to the pressure regulator test in that the micro-controller 34 regulates the operation of the pressure sensor via the multiplexer 22 and the first threshold output 30 of the dual window comparator 28 to make real-time measurements of fuel system pressure and to also regulate the operation of the fuel pump relay driver 66. This test first checks the electrical integrity of the fuel pump relay by using the fuel pump "short-open" detection circuit 68. If a fault is detected, indication of the fault is displayed on the liquid crystal display 74 and the test is aborted. If a fault condition is not detected, the micro-controller 34 turns on the fuel pump for three seconds via the fuel pump relay driver 66 and then turns the fuel pump "off", waits one second with the fuel pump in the "off" condition, measures the fuel pressure within the fuel delivery system and displays the pressure measurement on the liquid crystal display 74. The micro-controller 34 then measures the fuel pressure after 60 seconds and displays the original pressure measurement and the difference in pressure after 60 seconds on the liquid crystal display 74. In this manner, the pressure drop within the fuel delivery system can be determined. The technician can then consult manuals for acceptable pressure drop. It has been found that pressure measurements having an accuracy of plus or minus 2% can be achieved in this test.

The injector flow test measures individual fuel injector flow rates, both static and dynamic (pulsing). In this test, the micro-controller 34 causes the dual window comparator 28 to produce a voltage representative of a first pressure, e.g., 90% of original system pressure, at its first threshold output 30 and to produce a voltage representative of a second pressure, e.g., 80% of original system pressure, at its second threshold output 32. The foregoing voltages are utilized to measure the static flow and dynamic flow of fuel through the standard fuel injector 42 and through each of the fuel injectors in the vehicle being tested. Operationally, the static flow and dynamic flow of fuel through the standard fuel injector 42 is first measured. In order to measure the static flow through the standard fuel injector 42, the micro-controller 34 turns on the fuel pump for three seconds via the fuel pump relay driver 66, and then turns the fuel pump "off". After a pause of one second, the micro-controller 34 turns on the standard fuel injector 42 and measures the time required for the fuel pressure within the fuel delivery system to drop from the foregoing first pressure to the second pressure as set by first and second threshold outputs 30 and 32, respectively, of dual window comparator 28. If the pressure does not drop past the two thresholds within ten seconds, the injector flow test is aborted, an error message is displayed on the liquid crystal display 74 and the standard fuel injector 42 is turned off. It should be noted that the time measurements are stored and the foregoing process is repeated until two consecutive measurements within plus or minus 1% of one another are obtained. If such measurements have not been obtained within five attempts, the test is aborted and an error message is displayed. Once the above measurements have been made, two additional pressure drop measurements are taken in the same manner, except that the plus or minus 1% qualification is not required for these latter measurements. All four measurements are then used to develop an average time against which similar static flow measurements for each of the vehicle fuel injectors are compared.

In order to measure the dynamic flow through the standard fuel injector 42, the micro-controller 34 operates the fuel pump for three seconds via the fuel pump relay driver 66, turns the fuel pump off for one second, pulses the standard fuel injector 42 with a voltage pulse having a duration of 2.5 milliseconds "on" and 17.5 milliseconds "off", measures the time for the fuel pressure within the system to drop from the foregoing first pressure threshold to the second pressure threshold, and then turns off the standard fuel injector 42. If the pressure does not drop past the two thresholds within 20 seconds, the injector flow test is aborted and an error message is displayed on the liquid crystal display 74. Here again, it should be noted that the time measurements are stored and the foregoing process is repeated until two consecutive measurements within plus or minus 1% of one another are obtained. If such measurements have not been obtained within five attempts, the test is aborted and an error message is displayed. Once the above measurements have been obtained, two additional pressure drop measurements are taken in the same manner, except that the plus or minus 1% qualification is not required for these latter measurements. All four measurements are then used to develop an average time against which similar dynamic flow measurements for each of the vehicle fuel injectors are compared.

The two average times for static flow and dynamic flow are stored and used with the constants, the standard static flow rate (SSFR) and the standard dynamic flow rate (SDFR), to perform calculations on the flow rates of the vehicle fuel injectors as hereinafter described. It should be noted that the two constants for the flow rates through the standard fuel injector, i.e., SSFR and SDFR, are calibrated using two eight position binary switches, shown generally by the numeral 86, and an associated multiplexer 88 which is connected to an input to the micro-controller 34.

Prior to testing each of the vehicle fuel injectors for static and dynamic flow therethrough, the fuel injectors are tested for the voltage across and current through same. If any vehicle fuel injector is not within electrical specifications, it is marked as SHORT or OPEN according to its condition and is not tested for flow rate during the balance of the test procedure. When all electrical tests of the injectors have been completed, the group of injectors that has been found to be electrically acceptable is passed to the automatic testing procedure which is described as follows.

Each injector is tested once for a static flow time and a dynamic flow time in the same manner as the standard injector, i.e., elapsed time for pressure drop between the 90% and 80% thresholds. These times are used to determine the vehicle injector static flow rate (VSFR) and the vehicle injector dynamic flow rate (VDFR).

Where:

SSFR = Standard injector static flow rate (Calibrated using switches 86)

SDFR = Standard injector dynamic flow rate (Calibrated using switches 86)

VSFR = Vehicle injector static flow rate

VDFR = Vehicle injector dynamic flow rate

SSDT = Standard injector static drop time

SDDT = Standard injector dynamic drop time

VSDT = Vehicle injector static drop time

VDDT = Vehicle injector dynamic drop time

As the static drop time through each vehicle injector is measured, its static flow rate is calculated using the following formula:

$$SSFR \times (SSDT / VSDT) = VSFR$$

The dynamic drop time through each vehicle injector is then measured and used to calculate the dynamic flow rate in the same manner except that the standard injector dynamic flow rate and dynamic drop times are utilized:

$$SDFR \times SDDT\ VDDT) = VDFR$$

It should be noted that if the pressure does not drop between the two thresholds within a predetermined period of time (10 sec. for the static test and 20 sec. for the dynamic test) the injector is marked as STUCK and is skipped over for the remainder of the test.

These two flow rates (VSFR and VDFR) are retained in memory as each vehicle injector is tested. After all vehicle injectors have been tested, the foregoing process is repeated twice. At the end of the flow testing, three static and three dynamic flow rate measurements exist for each vehicle fuel injector. The final displayed values for each fuel injector are derived from the average of the three measurements for the respective injector:

$$(VSFR1 + VSFR2 + VSFR3) / 3 = (VSFR) \text{ Displayed Value}$$

$$(VDFR1 + VDFR2 + VDFR3) / 3 = (VDFR) \text{ Displayed Value}$$

After all average flow rate calculations have been completed, a injector dynamic balance test is performed on the results in the following manner. All vehicle injector dynamic flow rates are placed into groups which are within plus or minus 5% of each other. The largest group is determined and all of the flow rates within this group are averaged to derive the vehicle nominal dynamic flow rate. Each of the vehicle injector dynamic flow rates is then compared to this value. Any injector dynamic flow rate that is not within plus or minus 10% of the vehicle nominal dynamic flow rate is marked as out of balance for the final display of the test results.

When the foregoing tests have been completed, the static injector flow rate (VSFR) for the injector under test is displayed on the liquid crystal display 74 in pounds per hour (English) or grams/per second (metric) and the dynamic flow rate (VDFR) is similarly displayed on same in mg/pulse. The foregoing measurements have an accuracy of plus or minus 3%. If any failures have been detected prior to the injector flow test, or if the pressure does not drop past the two thresholds during a pre-determined period of time, such occurrences are shown on the liquid crystal display 74. These displays include "SHORT", "OPEN", "STUCK", where the first two displays refer to electrical failures, and the last display refers to a mechanical failure. Also at this time any injector found to be out of balance as previously described are shown on the display by placing an asterisk "*" along side of the dynamic flow rate value for that injector. Upon the completion of the injector flow test, the fuel pressure is reduced to approximately 2 psi through the standard fuel injector 42. The test results can then be viewed by the technician by actuating the push buttons 72. As each result is shown, the respective injector is provided with small pulses at 0.5 sec. intervals in order to identify it on the vehicle. The pulses will automatically stop when a count of 25 has been achieved and then restart when the next injector is selected.

Figure 2:
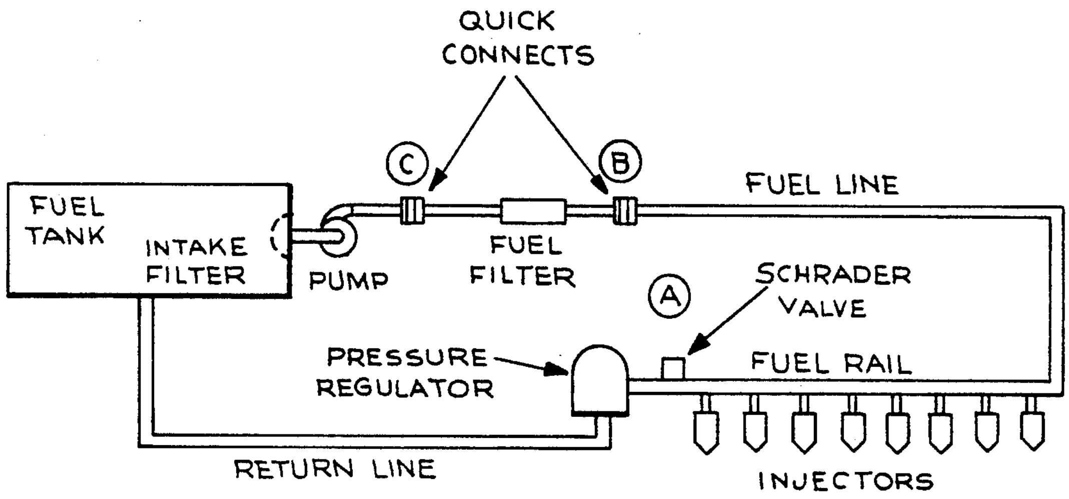
FIG. 2 is a schematic diagram of a typical fuel delivery system for an automobile.

The fuel system maximum flow test checks the ability of the fuel delivery system to deliver sufficient fuel during wide open throttle operation. In this test, the microcontroller 34 turns on the fuel pump for three seconds via the fuel pump relay driver 66 and then turns the fuel pump off for one second. The micro-controller 34 then measures the pressure within the fuel delivery system and sets the first threshold output 30 of comparator 28 to 75% of that value. The micro-controller 34 then turns on all of the vehicle fuel injectors via the injector drivers 58. When the pressure within the fuel delivery system has dropped to 75% of its initially measured pressure, the micro-controller 34 turns on the fuel pump again and sets the first threshold output 30 of comparator 28 to 95% of the initial system pressure. If the pressure within the fuel delivery system increases to 95% of its initially measured pressure in less than one second, the test indicates that the fuel delivery system is operating properly and the fuel injectors and fuel pump are turned "off" If the pressure within the fuel injection system fails to increase to 95% of its initially measured pressure within the foregoing one second time period, then the fuel delivery system is not operating properly In this case, the portion of the fuel system which is faulty can be located in the following manner. Referring to FIG. 2, the input hose to the tester 10, which is typically connected to the fuel rail on the vehicle being tested (point A in FIG. 2), is disconnected from same and is re-connected via a T-fitting to point B. After this connection has been made, the foregoing fuel system flow test is again undertaken to determine if the fuel line is defective. If this test proves that the fuel line is preventing the system pressure from increasing to 95% of its initially measured pressure within the one second time period, the fuel line can be replaced. Alternatively, the input hose to the tester can be disconnected from point B in FIG. 2, re-connected via a T-fitting to point C and the foregoing fuel system flow test can be repeated. If the pressure again fails to increase to 95% of its initially measured pressure within one second, then the fuel filter and lines can be cleaned, repaired or replaced, as necessary.

At the completion of all of the foregoing tests, the technician should purge the stored fuel from the fuel injection regulator system tester 10. If the fuel injection regulator system tester 10 is not purged at the completion of testing, a warning is displayed until a purge cycle has been completed. The foregoing warning is retained in the "no" purge memory circuit 80 even if the fuel injection regulator system tester 10 is disconnected and not used for an extended period of time. To purge the fuel injection regulator system tester 10, the technician re-establishes the vehicle electrical connections to the fuel injectors, disconnects the input hose from the fuel rail, connects the foregoing input hose to a Y-fitting 90 on the manifold return hose, and starts the vehicle. During engine starting, the relief air solenoid valve 52 is maintained open to prevent engine vacuum from drawing the fuel too quickly into the intake manifold or causing it to boil off into the manifold. Once a stable engine idle is achieved, the bulk of fuel within the fuel storage tank 48 is then metered slowly back to the vehicle intake manifold by modulating the relief air solenoid valve 52 closed in decreasing pulse widths. The purge and relief air solenoid valves 50 and 52, respectively, and the standard injector 42 are then alternately pulsed to draw the remaining fuel from the fuel storage tube 48 and to back flush any fuel from the fuel inlet hose through the Y-fitting 90 attached to the manifold return hose. The "no" purge memory circuit 80 is discharged by the purge memory discharge circuit 78 and the purge air solenoid valve 50. During the final phase of the purge, engine vacuum is monitored and the purge is aborted if vacuum is lost, i.e. "engine stall". The foregoing purge cycle takes approximately 4 minutes to complete.

The fuel injection regulator system tester 10 limits the number of tests which can be conducted without a purge cycle. For example, one injector flow test can be completed before the technician is forced to purge the system. The technician cannot re-enter the injector flow test until the system is purged. Three fuel system maximum flow tests can be completed before the the technician is warned to purge the system. In this case, the technician can re-enter the system flow test but will be warned on each subsequent test until the system is purged.

Another safety feature is provided by the fuel vapor sensor 82 and the fuel sensor circuit 84. If an internal fuel leak is present within the tester 10 or excessive fuel vapors exist in the testing area, the sensor 82 will detect same and provide an appropriate warning on the liquid crystal display 74. In this manner, the technician can take whatever corrective measures may be necessary to locate and correct the problem or return the tester 10 to the supplier for servicing.

We claim:

1. A device for testing the integrity of a fuel delivery system within a vehicle comprising means for pressuring the fuel delivery system for a first predetermined period of time; means for measuring the fuel pressure within the fuel delivery system after the expiration of said first predetermined period of time and after the expiration of a second predetermined period of time; and means for displaying said pressure measurements after said first and second predetermined periods of time.

2. A device for testing individual fuel injectors in a fuel delivery system comprising a fuel injector used as a standard against which the individual fuel injectors are compared; means for pressurizing the fuel delivery system; means for actuating said standard fuel injector permitting the passage of fuel therethrough; means for measuring the time required for the fuel pressure within the fuel delivery system to drop from a first predetermined pressure to a second predetermined pressure; means for repressurizing the fuel delivery system; means for actuating each individual fuel injector within the fuel delivery system; means for measuring the time required for the fuel pressure within the fuel delivery system to drop from said first predetermined pressure to said second predetermined pressure for each individual fuel injector; and means for comparing said time measurement for each individual fuel injector with said time measurement for said standard fuel injector to produce an indication of fuel flow through each individual fuel injector.

3. The testing device as defined in claim 2 wherein said standard fuel injector is actuated by said standard fuel injector actuating means until said measuring means produces a first predetermined number of time measurements within a predetermined range.

4. The testing device as defined in claim 3 wherein said first predetermined number of time measurements for said standard fuel injector are consecutive measurements.

5. The testing device as defined in claim 3 further including means for averaging said first predetermined number of time measurements for said standard fuel injector with a second predetermined number of time measurements for said standard fuel injector to produce an average time measurement for the fuel pressure within the fuel delivery system to drop from said first predetermined pressure to said second predetermined pressure when said standard fuel injector is actuated, said comparing means comparing said average time measurement for said standard fuel injector with said time measurements for each individual fuel injector.

6. The testing device as defined in claim 2 wherein each individual fuel injector is actuated by said individual fuel injector actuating means until said measuring means produces a first predetermined number of time measurements within a predetermined range for each individual fuel injector.

7. The testing device as defined in claim 6 wherein said first predetermined number of time measurements for each individual fuel injector are consecutive measurements.

8. The testing device as defined in claim 6 further including means for averaging said first predetermined number of time measurements for each fuel individual fuel injector with a second predetermined number of time measurements for each individual fuel injector to produce an average time measurement for the fuel pressure within the fuel delivery system to drop from said first predetermined pressure to said second predetermined pressure when each individual fuel injector is actuated, said comparing means comparing said average time measurement for each individual fuel injector with said time measurements for said standard fuel injector.

9. The testing device as defined in claim 2 wherein said standard fuel injector is actuated by said standard fuel injector actuating means until said measuring means produces a first predetermined number of time measurements within a predetermined range for said standard fuel injector, and wherein each individual fuel injector is actuated by said individual fuel injector actuating means until said measuring means produces a first predetermined number of time measurements within a predetermined range for each individual fuel injector.

10. The testing device as defined in claim 9 wherein said first predetermined number of time measurements for said standard fuel injector are consecutive measurements.

11. The testing device as defined in claim 9 wherein said first predetermined number of time measurements for each individual fuel injector are consecutive measurements.

12. The testing device as defined in claim 9 further including means for averaging said first predetermined number of time measurements for said standard fuel injector with a second predetermined number of time measurements for said standard fuel injector to produce an average time measurement for the fuel pressure within the fuel delivery system to drop from said first predetermined pressure to said second predetermined pressure when said standard fuel injector is actuated, and means for averaging said first predetermined number of time measurements for each individual fuel injector with a second predetermined number of time measurements for each individual fuel injector to produce an average time measurement for the fuel pressure within the fuel delivery system to drop from said first predetermined pressure to said second predetermined pressure when each individual fuel injector is actuated, said comparing means comparing said average time measurement for said standard fuel injector with said average time measurement for each individual fuel injector.

13. The device as defined in claim 2 wherein said standard fuel injector actuating means is actuated by a continuous pulse causing said comparing means to produce an indication of static flow through said standard fuel injector.

14. The device as defined in claim 2 wherein said individual fuel injector actuating means is actuated by a continuous pulse causing said comparing means to produce an indication of static flow through each individual fuel injector.

15. The device as defined in claim 2 wherein said standard fuel injector actuating means is actuated by a series of pulses causing said comparing means to produce an indication of dynamic flow through said standard fuel injector.

16. The device as defined in claim 2 wherein said individual fuel injector actuating means is actuated by a series of pulses causing said comparing means to produce an indication of dynamic flow through each individual fuel injector.

17. A device for testing a fuel delivery system comprising means for pressurizing the fuel delivery system utilizing fuel injectors for a first predetermined period of time; means for actuating the fuel injectors within the fuel delivery system causing the pressure within the fuel delivery system to drop to a first predetermined pressure; means for repressurizing the fuel delivery system to a second predetermined pressure, and means for measuring the time required for the pressure within the fuel delivery system to increase from said first predetermined pressure to said second predetermined pressure.

* * * * *